(12) United States Patent
Ban et al.

(10) Patent No.: US 11,038,162 B2
(45) Date of Patent: Jun. 15, 2021

(54) COATED SEMICONDUCTOR PARTICLES AND METHODS OF MAKING THE SAME

(71) Applicants: Alliance for Sustainable Energy, LLC, Golden, CO (US); ALD NanoSolutions, Inc., Broomfield, CO (US)

(72) Inventors: Chunmei Ban, Golden, CO (US); Seoung-Bum Son, Boston, MA (US); Markus Daniel Groner, Louisville, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 174 days.

(21) Appl. No.: 15/994,016

(22) Filed: May 31, 2018

(65) Prior Publication Data

US 2018/0351168 A1 Dec. 6, 2018

Related U.S. Application Data

(60) Provisional application No. 62/513,081, filed on May 31, 2017.

(51) Int. Cl.
*H01M 4/36* (2006.01)
*H01M 4/62* (2006.01)
(Continued)

(52) U.S. Cl.
CPC .............. *H01M 4/366* (2013.01); *B01J 13/02* (2013.01); *H01M 4/0471* (2013.01);
(Continued)

(58) Field of Classification Search
None
See application file for complete search history.

(56) References Cited

U.S. PATENT DOCUMENTS

| 6,613,383 | B1 | 9/2003 | George et al. |
| 6,913,827 | B2 | 7/2005 | George et al. |

(Continued)

FOREIGN PATENT DOCUMENTS

| WO | WO 2016/100873 A1 | 6/2016 |
| WO | WO 2016/205242 A1 | 12/2016 |

OTHER PUBLICATIONS

Jen (Shih-Hui Jen et al., "Alucone Interlayers to Minimize Stress Caused by Thermal Expansion Mismatch between Al2O3 Films and Teflon Substrates", ACS Appl. Mater. Interfaces 2013, 5, 3, 1165-1173) (Year: 2012).*

(Continued)

*Primary Examiner* — Jeremiah R Smith
(74) *Attorney, Agent, or Firm* — Michael A. McIntyre

(57) ABSTRACT

The present disclosure relates to an electrode material that includes a solid core particle having an outer surface and including at least one of a Group II element, a Group III element, a Group IV element, a Group V element, and/or a Group VI element, and a layer including a polymer, where the solid core particle has a characteristic length between greater than zero nanometers and 1000 nm, the layer substantially covers all of the outer surface, the layer has a thickness between greater than zero nanometers 100 nm, and the layer is capable of elastically stretching as a result of expansion and contraction by the solid core.

13 Claims, 8 Drawing Sheets

(51) Int. Cl.
*B01J 13/02* (2006.01)
*H01M 4/04* (2006.01)
*H01M 4/1393* (2010.01)
*H01M 4/134* (2010.01)
*H01M 4/1395* (2010.01)
*H01M 4/133* (2010.01)
*H01M 4/38* (2006.01)
*H01M 4/587* (2010.01)
*B22F 1/00* (2006.01)
*H01M 4/583* (2010.01)

(52) U.S. Cl.
CPC ........... *H01M 4/133* (2013.01); *H01M 4/134* (2013.01); *H01M 4/1393* (2013.01); *H01M 4/1395* (2013.01); *H01M 4/628* (2013.01); *B22F 1/0062* (2013.01); *C04B 2235/441* (2013.01); *H01M 4/386* (2013.01); *H01M 4/387* (2013.01); *H01M 4/583* (2013.01); *H01M 4/587* (2013.01); *H01M 4/625* (2013.01)

(56) References Cited

U.S. PATENT DOCUMENTS

| | | | |
|---|---|---|---|
| 9,376,750 B2 | 6/2016 | George et al. | |
| 2007/0166607 A1* | 7/2007 | Okada | H01M 10/0525 429/90 |
| 2010/0178481 A1 | 7/2010 | George et al. | |
| 2012/0121932 A1 | 5/2012 | George et al. | |
| 2016/0351443 A1 | 12/2016 | George et al. | |
| 2016/0351973 A1* | 12/2016 | Albano | H01M 10/0525 |
| 2017/0222222 A1* | 8/2017 | Lee | H01M 4/366 |
| 2018/0277830 A1* | 9/2018 | Xing | H01M 10/0567 |

OTHER PUBLICATIONS

Ban et al., "Molecular Layer Deposition for Surface Modification of Lithium-Ion Battery Electrodes," Advanced Materials Interfaces, 2016, 12 pages.

Choudhury et al., "Molecular layer deposition of alucone films using trimethylaluminum and hydroquinone," Journal of the Vacuum Society Technology A, Jan./Feb. 2015, vol. 33, No. 1, 7 pages.

Dameron et al., "Molecular Layer Deposition of Alucone Polymer Films Using Trimethylaluminum and Ethylene Glycol," Chemistry of Materials, 2008, vol. 20, pp. 3315-3326.

Park et al., "Intramolecular and Intermolecular Interactions in Hybrid Organic-Inorganic Alucone Films Grown by Molecular Layer Deposition," Applied Materials & Interfaces, 2016, vol. 8, pp. 17489-17498.

Piper et al., "Reversible High-Capacity Si Nanocomposite Anodes for Lithium-ion Batteries Enabled by Molecular Layer Deposition," Advanced Materials, 2014, vol. 26, pp. 1596-1601.

Yoon et al., "Molecular Layer Deposition of Hybrid Organic-Inorganic Alucone Polymer Films Using a Three-Step ABC Reaction Sequence," Chemistry of Materials, 2009, vol. 21, pp. 5365-5374.

* cited by examiner

COATED SEMICONDUCTOR PARTICLES AND METHODS OF MAKING THE SAME

CROSS-REFERENCE TO RELATED APPLICATIONS

This application claims the benefit of U.S. Provisional Patent Application No. 62/513,081 filed May 31, 2017, the contents of which are incorporated herein by reference in their entirety.

CONTRACTUAL ORIGIN

The United States Government has rights in this disclosure under Contract No. DE-AC36-08GO28308 between the United States Department of Energy and Alliance for Sustainable Energy, LLC, the Manager and Operator of the National Renewable Energy Laboratory.

SUMMARY

An aspect of the present disclosure is an electrode material that includes a solid core particle having an outer surface and including at least one of a Group II element, a Group III element, a Group IV element, a Group V element, and/or a Group VI element, and a layer including a polymer, where the solid core particle has a characteristic length between greater than zero nanometers and 1000 nm, the layer substantially covers all of the outer surface, the layer has a thickness between greater than zero nanometers 100 nm, and the layer is capable of elastically stretching as a result of expansion and contraction by the solid core.

In some embodiments of the present disclosure, the solid core particle may include at least one of silicon, tin, germanium, and/or carbon. In some embodiments of the present disclosure, the solid core particle may be constructed from at least one of silicon and/or carbon. In some embodiments of the present disclosure, the polymer may include a metal. In some embodiments of the present disclosure, the polymer may include a metal alkoxide. In some embodiments of the present disclosure, the metal alkoxide may include at least one of titanium alkoxide, vanadium alkoxide, niobium alkoxide, zirconium alkoxide, lanthanum alkoxide, tantalum alkoxide, iron alkoxide, manganese alkoxide, aluminum alkoxide, zinc alkoxide, and/or magnesium alkoxide. In some embodiments of the present disclosure, the characteristic length may be between greater than zero nanometers and 100 nm. In some embodiments of the present disclosure, the thickness may be between greater than zero nanometers and 10 nm. In some embodiments of the present disclosure, the layer may have an elastic modulus between 25 GPa and 200 GPa.

In some embodiments of the present disclosure, the electrode material may further include an ion that includes at least one of lithium, sodium, and/or magnesium, where the ion is capable of reversible transfer through the layer, and the solid core particle is capable of reversible intercalation/decalation of the ion within at least a portion of the solid core particle. In some embodiments of the present disclosure, the electrode material may further include a specify capacity of greater 400 mAh/g after at least 100 cycles of the reversible interaction/decalation. In some embodiments of the present disclosure, the electrode material may further include a Coulombic efficiency of greater than 85%.

An aspect of the present disclosure is an electrode material that includes a solid core particle having an outer surface and at least one of graphite and/or silicon, a layer that includes aluminum alkoxide, an ion that includes at least one of lithium, sodium, and/or magnesium, a specify capacity of greater 400 mAh/g, and a Coulombic efficiency of greater than 85%, where the solid core particle has a characteristic length between greater than zero nanometers and 100 nm, the layer substantially covers all of the outer surface, the layer has a thickness between greater than zero nanometers 10 nm, the layer has an elastic modulus between 25 GPa and 200 GPa, the ion is capable of reversible transfer through the layer, the solid core particle is capable of reversible intercalation/decalation of the ion within at least a portion of the solid core particle, and the specific capacity and the Coulombic efficiency are maintained after at least 100 cycles of the reversible intercalation/decalation.

An aspect of the present disclosure is a method that includes heating in a container a plurality of particles comprising a semiconductor and adding to the container a first reactant that includes a metal and a second reactant that includes at least one of carbon, oxygen, and/or hydrogen, where the heating and the adding result in the first reactant and the second reactant reacting, further resulting in the forming of an elastic layer on a surface of substantially each of the particles. In some embodiments of the present disclosure, the heating may be to a first temperature between 100° C. and 200° C. In some embodiments of the present disclosure, the adding may be performed at a second temperature substantially the same as the first temperature. In some embodiments of the present disclosure, the method may further include, during at least one of the heating and/or the adding, directing a gas into the container, where the gas at least partially fluidizes the plurality of particles. In some embodiments of the present disclosure, the gas may be an inert gas. In some embodiments of the present disclosure, at least one of the heating and/or the adding may be performed at a pressure less than 1.01325 bar absolute. In some embodiments of the present disclosure, the adding is repeated at least once.

BACKGROUND

Silicon is the most abundant element in the Earth's crust. Silicon combines with lithium to form $Li_{15}Si_4$, which enables a high gravimetric capacity of 3,579 mAh/g. However, silicon-based electrodes experience a volume expansion of up to 300 percent with the resulting occurrence of mechanical failures such as cracks and pulverizations. Silicon electrodes show very poor cycling stability due to the enormous volume changes and unstable solid-electrolyte interphase formation of silicon that occur as a result of lithiation/delithiation of the silicon. As a result, cycling of silicon electrodes results in a gradual capacity degradation and eventually a silicon electrode loses its entire reversible storage capability after about 50 cycles. This poor life cycle prevents the use of silicon in rechargeable, commercial Li-ion batteries. Coatings deposited by molecular layer deposition (MLD) methods can accommodate the volume changes, furthermore, potentially stabilize the surface of silicon particles, and provide higher storage capacities and longer cycling life-spans. However, MLD coatings on electrodes tend to yield relatively low productivity. Thus, there remains a need for improved battery electrodes, utilizing common materials, that provide higher storage capacities and longer cycling life-spans.

DETAILED DESCRIPTION

Figure 1:
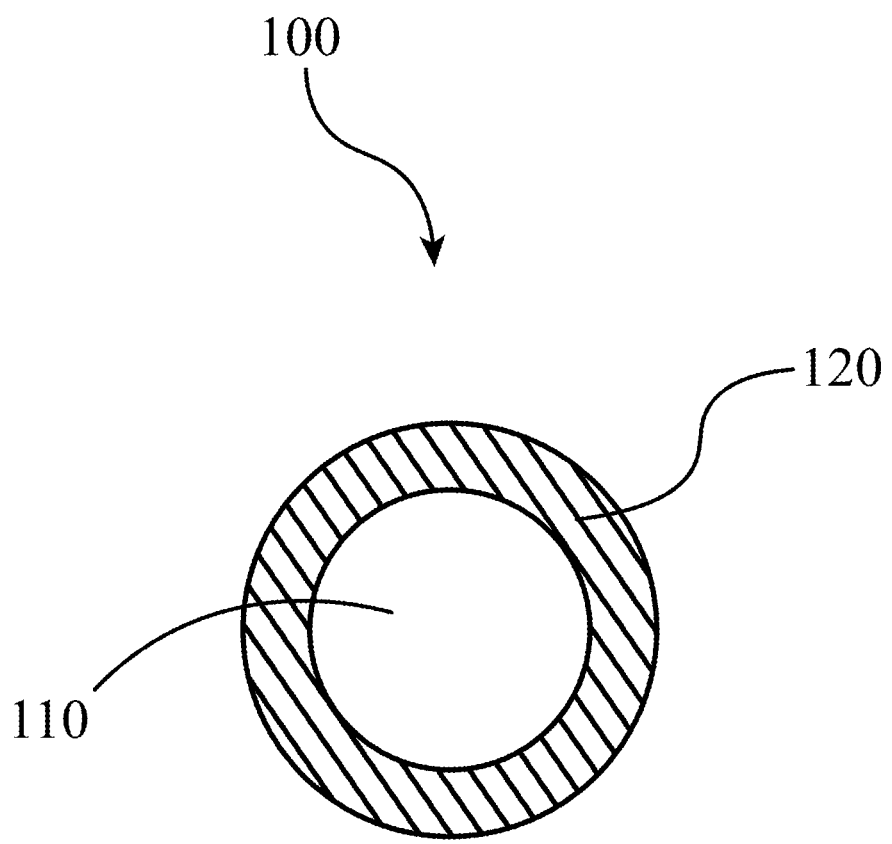
FIG. 1 illustrates an electrode material constructed of a solid core covered with a layer, according to some embodiments of the present disclosure.

Referring to FIG. 1, an aspect of the present disclosure is an electrode material 100 having a solid core 110 with an outside surface covered substantially with a layer 120. In some embodiments of the present disclosure, the solid core 110 may include electrochemical materials such as silicon, tin, germanium, and/or graphite, etc. In some embodiments of the present disclosure, the solid core 110 may include at least one semiconductor material, including at least one Group II, III, IV, V, and/or VI element. Examples of intercalating cations include at least one of lithium ions, sodium ions, and/or magnesium ions. A solid core 110 may be characterized by a spherical shape, as shown in the example of FIG. 1. However, a solid core 110 may be in the form of any other suitable shape; e.g. cylindrical, amorphous particulate, and/or an irregular shape. In addition, a solid core 110 may be constructed of a solid shell with an internal cavity; e.g. the solid core 110 may be at least partially hollow. A solid core 110 may have a characteristic length or diameter between greater than zero nanometers and 1000 nm or between greater than zero nanometers and 100 nm.

Referring again to FIG. 1, the layer 120 may substantially cover all of the outside surface of the solid core 110 of the electrode material 100. As used herein, the term "substantially" is used to indicate that in some embodiments of the present disclosure, 100% of the targeted goal is achieved, however, due to experimental conditions, manufacturing conditions, and other naturally occurring variability, less than 100% of the targeted goal is likely, yet still falls within the scope of the present disclosure. Thus, for example, the phrase "the layer 120 may substantially cover all of the outside surface of the solid core 110", means that in some embodiments 100% of the outside surface of the solid core 110 is coated/covered by the layer 120. However, other embodiments, where less that the targeted goal of 100% coverage is achieved, also fall within the scope of the present disclosure; e.g. greater than 98% coverage, greater than 99% coverage, greater than 99.9% coverage. In some embodiments of the present disclosure, the layer 120 may have a thickness between greater than zero nanometers and 100 nm or between greater than zero nanometers and 10 nm. In some embodiments of the present disclosure, the layer 120 covering the solid core 110 may be a polymer material. In addition, a polymer material may include a metal, such as at least one of aluminum, zinc, and/or magnesium. The layer 120 may be rigid and/or flexible. In some embodiments of the present disclosure, the layer 120 covering the solid core 110 may be a polymeric metal alkoxide, including at least one of aluminum alkoxide (alucone), titanium alkoxide, vanadium alkoxide, niobium alkoxide, zirconium alkoxide, lanthanum alkoxide, tantalum alkoxide, iron alkoxide, manganese alkoxide, aluminum alkoxide, zinc alkoxide, and/or magnesium alkoxide, etc. Metal alkoxides (e.g. alucone) may be elastic to accommodate volume changes occurring during lithiation/delithiation of the solid core 110 and may also chemically stabilize the outside surfaces of the solid core 110 (e.g. silicon).

Figure 2:
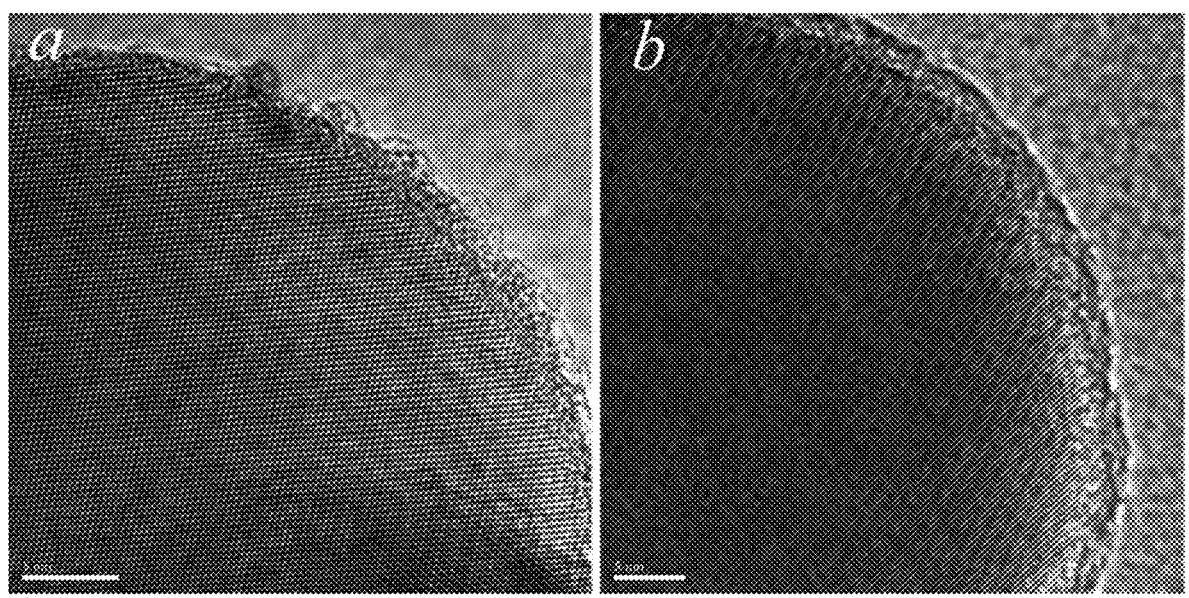
FIG. 2 illustrates transmission electron microscopy (TEM) images of an uncoated solid core of silicon (see panel "a"), and a silicon particle coated with aluminum alkoxide (referred to herein as "alucone") (see panel "b"), according to some embodiments of the present disclosure. The conformal alucone-coating, as shown in FIG. 2, has a thickness of about 2 nm (scale bar 5 nm).

For at least some of the experiments described herein, electrodes were constructed using the electrode materials 100 described above, including the solid cores 110 (e.g. silicon and/or graphite particles) covered with layers 120 (e.g. metal alkoxides, alucone), by combining the electrode materials 100 with carbon black, a binder (e.g. a polyacrylic acid binder) into a mixture using a liquid (e.g. 1-methyl-2-pyrrolidinone). The resultant mixtures (solution) were coated on metal foils (e.g. copper) and then dried in an air environment. Before assembling the cells, punched electrodes (diameter of 1.4 cm) were dried overnight (100° C.) in a vacuum oven. Electrolyte was formulated using 1.2 M $LiPF_6$ in ethylene carbonate (EC) and ethyl methyl carbonate (EMC) (at 3:7 ratio by weight of EC to EMC) with 10 wt % fluoroethylene carbonate. The resultant cells were assembled in an argon-filled glove box and tested at room temperature. Standard CR2032 coin cells with lithium metal foil as counter electrodes were used. In one example of the present disclosure, an electrode constructed of a silicon solid core coated with alucone was produced. As shown herein, the coated electrode demonstrated significantly improved capacity retention (CE>99%) up to 100 cycles. FIG. 2 illustrates transmission electron microscopy (TEM) images of the uncoated solid core silicon particle (see panel "a"), and the alucone coated solid core silicon particles (see panel "b").

Figure 3:
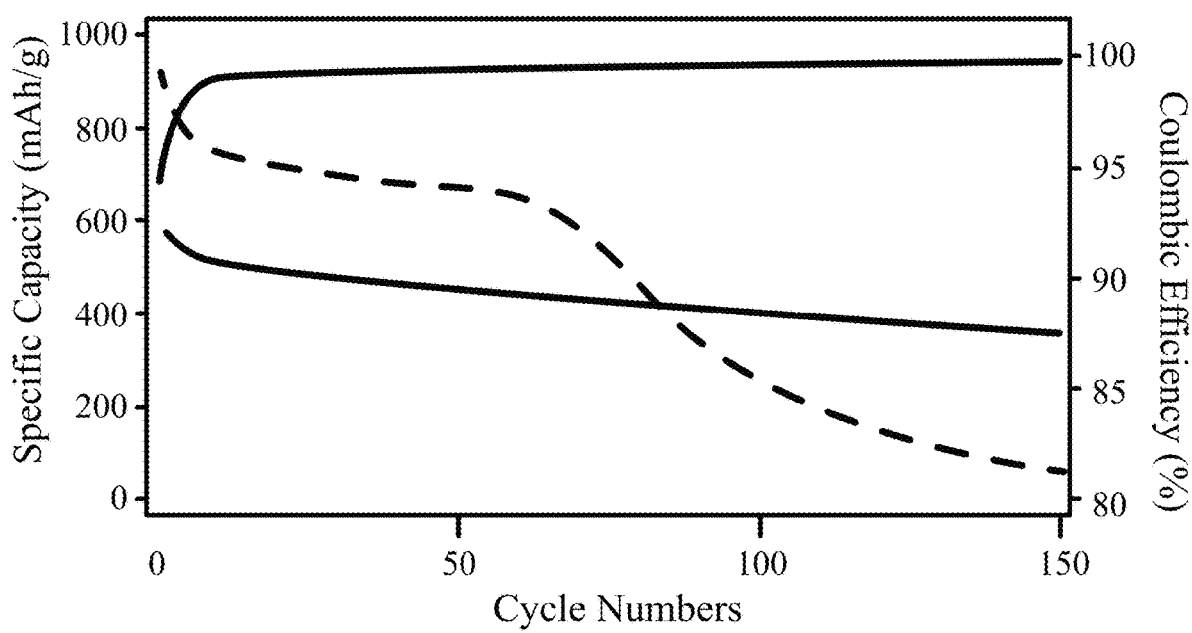
FIG. 3 illustrates the cycling behavior of an uncoated silicon/graphite electrode (dashed line) and a silicon/graphite electrode coated with alucone (solid lines), according to some embodiments of the present disclosure.

FIG. 3 shows the cycling performance of two electrodes, both constructed of electrode materials having composite solid cores of both graphite (73 wt %) and silicon (15 wt %), with one coated with Alucone and the other uncoated. Galvanostatic charging and discharging were performed in a half-cell configuration with lithium metal as a counter electrode. Addition of 15 wt % of silicon to a graphite-based electrode resulted in the increase of the specific capacity from 372 mAh/g to 918 mAh/g, and improved Coulombic efficiency (CE, as shown in the right axis). The uncoated silicon/graphite electrode demonstrated fast capacity degradation after 60 cycles and the composite electrode lost its entire reversible storage capability after 150 cycles (dashed line). This indicates that even small portions of silicon materials in a graphite-based solid core electrode can impede the lithiation/delithiation. In contrast, the electrode made of the alucone-coated silicon/graphite composite solid core particles (solid lines) demonstrated a sustainable cycling performance.

Figure 4:
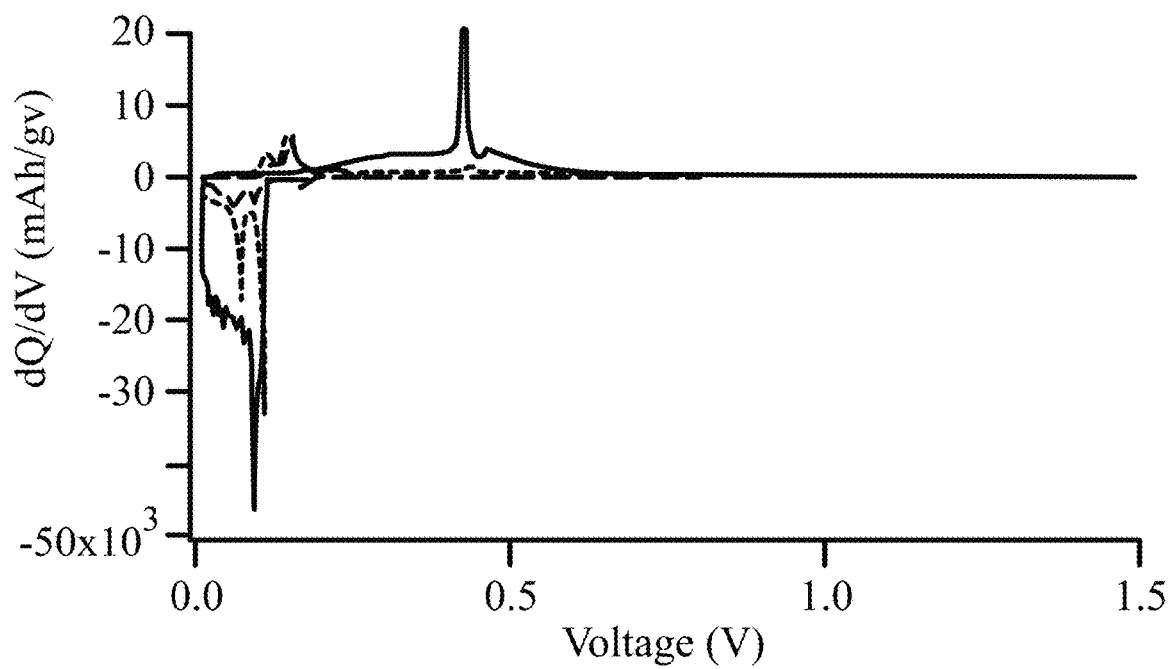
FIG. 4 illustrates the differential capacity (dQ/dV) plots for an uncoated graphite electrode, a silicon electrode coated with alucone, and a silicon/graphite composite electrode coated with alucone, according to some embodiments of the present disclosure.
Figure 4:
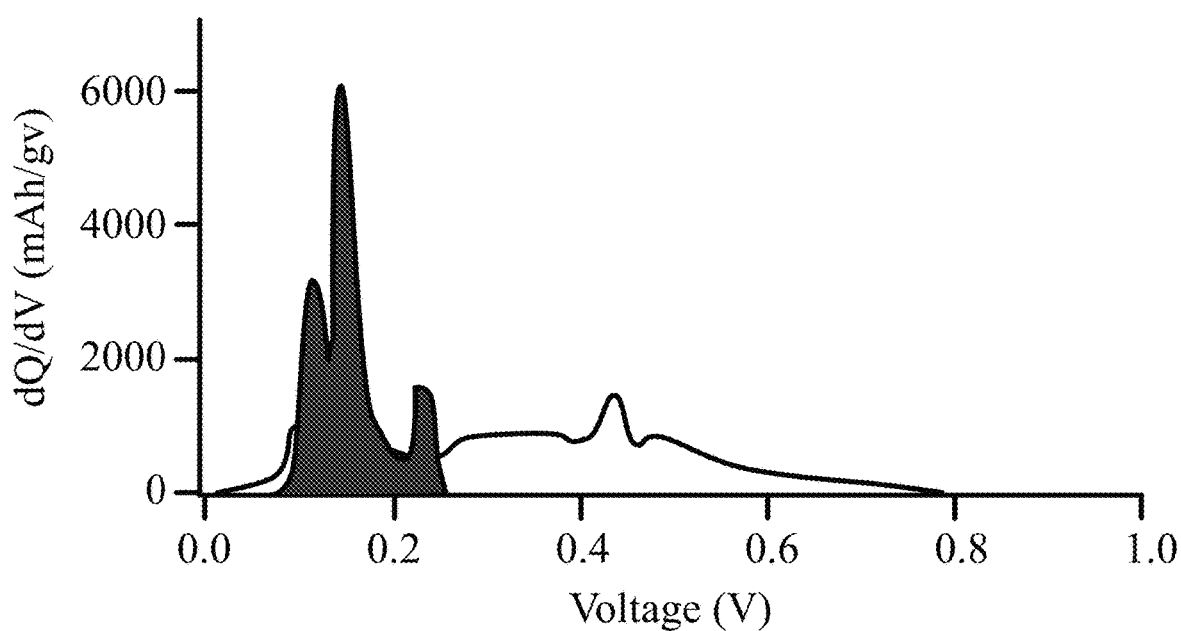

FIG. 4 (top) illustrates the differential capacity (dQ/dV) plots measured for an uncoated graphite electrode, a silicon electrode coated with alucone, and a silicon/graphite composite electrode coated with alucone, according to some embodiments of the present disclosure. The graphite electrode (anode) was composed of graphite, carbon black (CB), and polyacrylic acid (PAA) at a composition of 88 wt %, 2 wt %, and 10 wt %, respectively (long dashed line). The silicon electrode (anode) was composed of silicon, carbon black, and PAA, at a composition of 70 wt %, 15 wt %, and 15 wt %, respectively (solid line). The composite electrode was constructed using graphite, silicon, CB, and PAA, at a composition of 73 wt %, 15 wt %, 2 wt %, and 10 wt %, respectively (short dashed line). Note that the anodic potential peaks that occurred between 0.25 V and 0.5 V are due to the delithiation of silicon anode, while the delithiation of graphite usually completes before 0.3 V. However, it is hard to distinguish the cathodic potential peaks of the silicon component from the lithiation peaks of the graphite anode. Therefore, the delithiation dQ/dV curves were used to evaluate the reversibility of the silicon component. FIG. 4 (bottom) displays the contribution of delithiation capacity from each component, the graphite particles (filled curve) and silicon particles (unfilled curve), respectively.

In some embodiments of the present disclosure, molecular layer deposition (MLD) methods were successfully utilized to coat solid core particles of silicon. For example, silicon particles having a characteristic length of about 50 nm were coated with a layer of alucone having a thickness of about 2 nm. The coated silicon particles showed high reversible capacity. Significantly improved capacity retention (CE>99%) was observed in the composite the graphite/silicon electrode coated with alucone. As exhibited in FIG. 4, the uncoated composite graphite/silicon electrode experienced fast capacity decay after 60 cycles. However, the electrode constructed of the composite graphite/silicon solid core coated with alucone demonstrated sustainable cycling performance.

Figure 5:
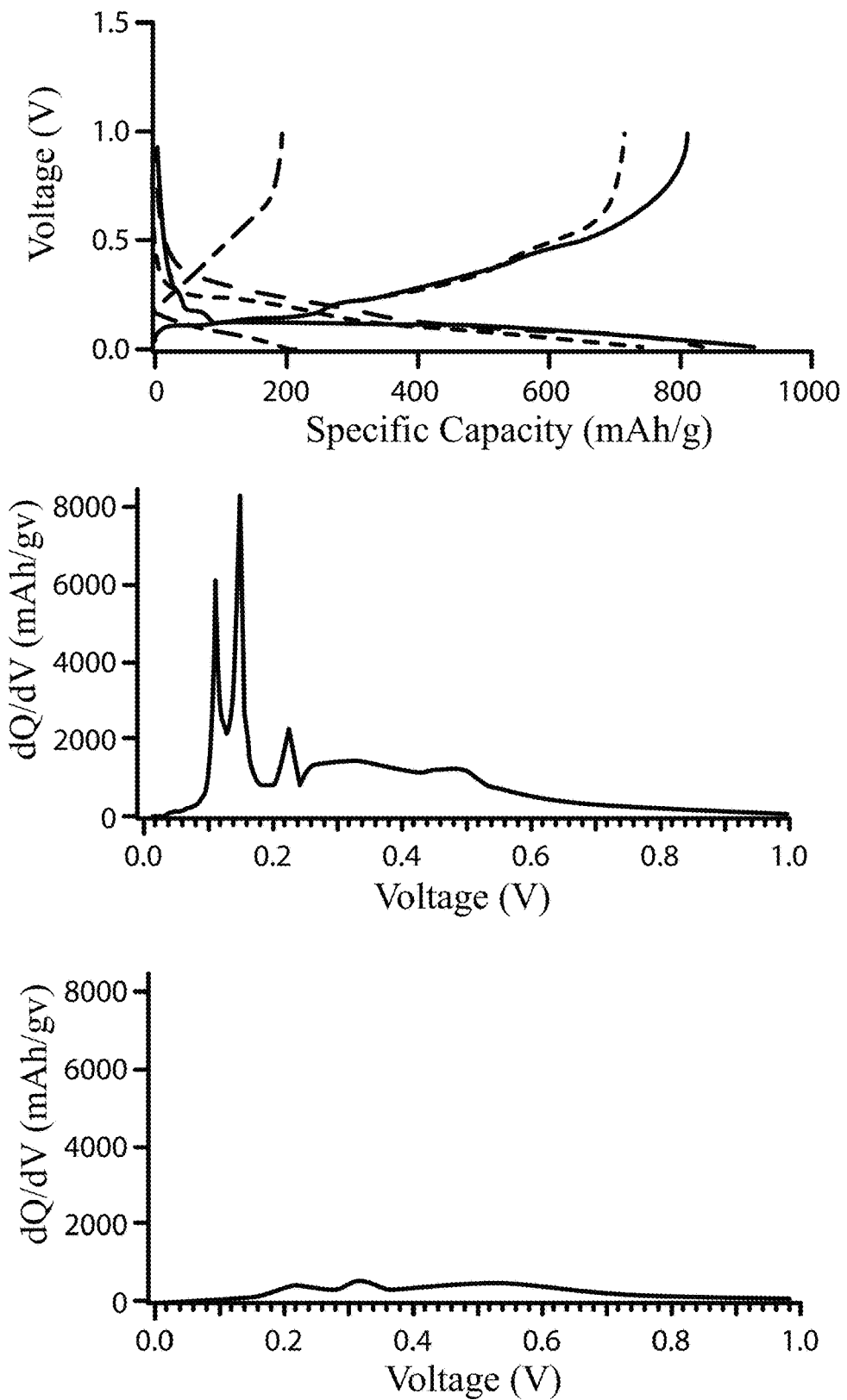
FIG. 5 illustrates performance metrics for an uncoated electrode constructed using a composite solid core of graphite and silicon, according to some embodiments of present disclosure: (top) a voltage profile of this electrode cycling between 10 mV and 1 V; (middle) the corresponding differential capacity (dQ/dV) plots during delithiation at the first cycle; and (bottom) at the 100th cycle.
Figure 6:
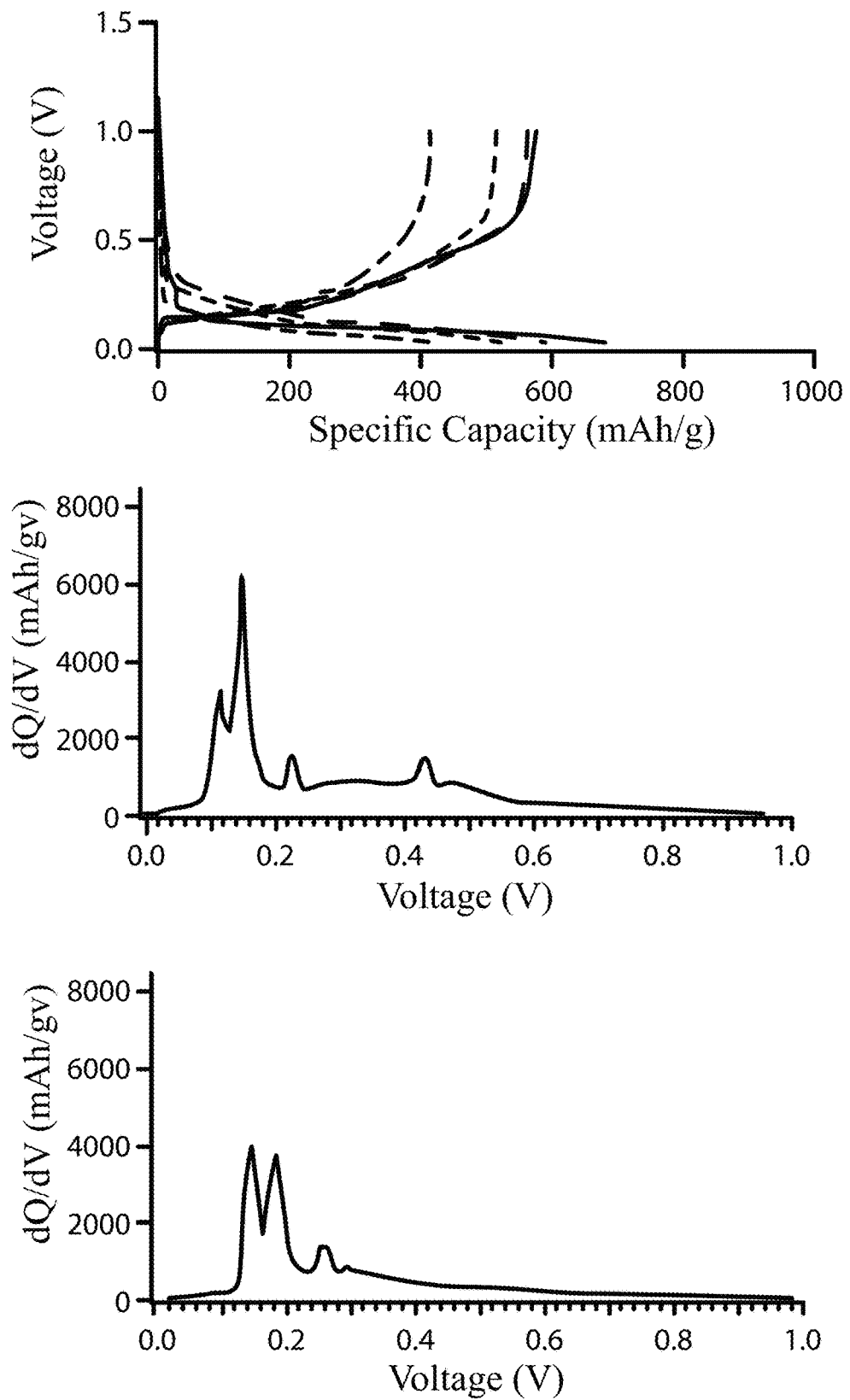
FIG. 6 illustrates performance metrics for an alucone-coated electrode constructed using a composite solid core of graphite and silicon, according to some embodiments of present disclosure: (top) a voltage profile of this electrode cycling between 10 mV and 1 V; (middle) the corresponding differential capacity (dQ/dV) plots during delithiation at the first cycle; and (bottom) at the $100^{th}$ cycle.

To investigate the evolution in the voltage profile during cycling, the differential capacities (dQ/dV) were determined. FIGS. 5 and 6 illustrate the voltage profiles and the dQ/dV curves of an uncoated composite graphite/silicon electrode and an alucone-coated composite graphite/silicon electrode, respectively. The dQ/dV curves for the $1^{st}$ and $100^{th}$ cycle have been plotted for these two electrodes (middle and bottom plots, respectively). Both electrodes show similar behavior during the $1^{st}$ cycle, with capacity contributions from both components (graphite and silicon). During cycling, the delithiation peaks from the silicon component broadened and the peak currents gradually decreased for both electrodes. However, after 100 cycles, the peaks from the graphite component disappeared for the cell utilizing the uncoated composite electrode, whereas the cell utilizing the coated composite electrode demonstrated stable capacity with cycling. Interestingly, the electrochemical behavior of silicon in the composite electrode affects the cycling performance of the other component (graphite) in the composite electrode. The top plot of FIG. 4 illustrates the voltage versus specific capacity curves for the uncoated composite electrode, and the top plot of FIG. 4, illustrates the voltage versus specific capacity curves for the coated composite electrode (solid line—first cycle; long dashed line—$2^{nd}$ cycle; short dashed line—$10^{th}$ cycle; long dash/short dash—100 cycle).

Figure 7:
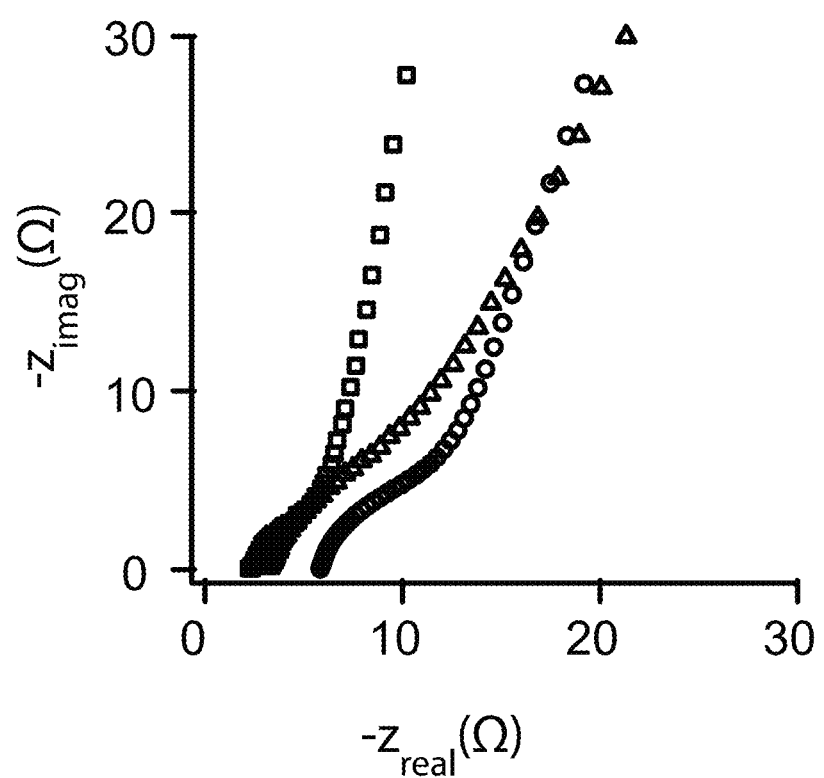
FIG. 7 illustrates electrochemical impedance spectroscopy (EIS) data for various electrodes, according to some embodiments of the present disclosure.

To further evaluate the insulating properties, electrochemical impedance spectroscopy (EIS) was used to evaluate the conductivity of the electrodes, with and without alucone coatings. FIG. 7 compares the EIS for the alucone-coated electrodes constructed with the composite graphite/silicon solid core (circles) to the same solid core composition without the alucone coating (triangles), and to an electrode having a pure silicon solid core coated with alucone (squares), indicating the conductivity/impedance evolution during electrochemical cycling for each of these electrodes. All of the EIS data were collected in symmetric cells—both the anode and the cathode were constructed using the same electrode materials. Referring again to FIG. 7, the initial $R_s$ observed in the high-frequency region indicates the electronic conductivity of the electrodes. Not surprisingly, the alucone coated electrode demonstrated the highest resistance, due to the coatings insulating affects. The electrode using a pure silicon solid core coated with alucone demonstrated similar electronic conductivity to the uncoated composite electrode.

Figure 8:
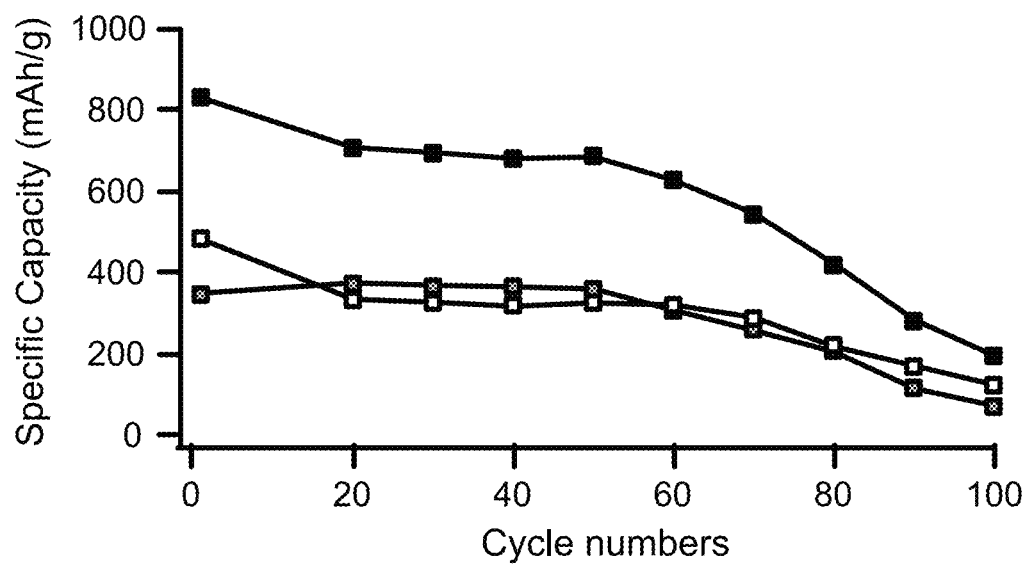
FIG. 8 illustrates the charge-capacity contribution of silicon and graphite in an uncoated electrode (top), to that of an alucone-coated electrode having a silicon solid core (bottom), according to some embodiments of the present disclosure.
Figure 8:
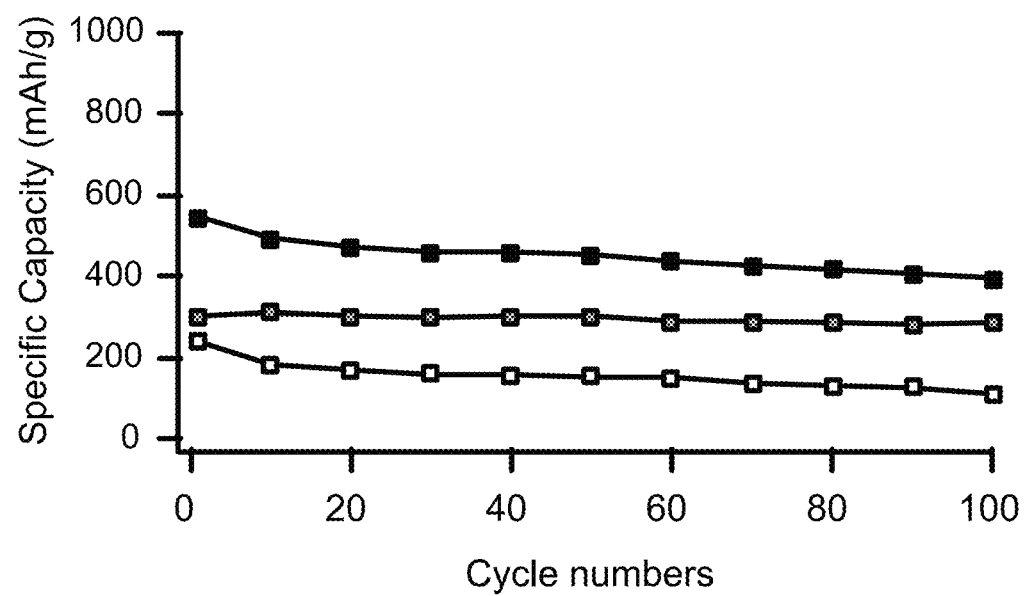

Further electrochemical analysis was performed by integrating the differential plots of the electrodes constructed from the composite graphite/silicon solid cores to see the individual capacity contributions of graphite and silicon in the electrode. As graphite and silicon barely share the potential range for their delithiation reaction, it is possible to measure the delithiation capacity of each graphite and Si, respectively. FIG. 8 (top plot) displays the total charge capacity of the electrode constructed with the composite graphite/silicon solid core (dark filled squares), and the contribution of delithiation capacity from each component; graphite—lightly filled squares; silicon—empty squares. Remarkably, the capacity from the graphite component degrades simultaneously with a decay in the silicon component. Given the stable electrochemical performance of the graphite anode, this indicates that the degradation occurring in the silicon component affected the cycling performance of the graphite component of the composite anode, and eventually caused the electrode to fail. Referring again to FIG. 8 (bottom plot), in strong contrast, the silicon anode coated with MLD-deposited alucone layers demonstrated stable cycling capacity of the composite anode; total contribution—solid squares; graphite contribution—lightly filled squares; coated silicon contribution—empty squares.

Example of molecular layer deposition method for depositing alucone onto silicon powder: 9.5 g of 50 nm silicon powder was loaded into a small fluidized bed ALD reactor. The silicon powder had a volume of ~70 ml. The powder was heated to ~170° C. under low pressure nitrogen to fluidize the powder. The glycerol (GL) was heated to between 110° and 120 C°. Five MLD cycles were performed exposing the silicon to trimethylaluminum (TMA) and GL, while monitoring and controlling the process with a mass spectrometer. 10.0 grams of alucone coated silicon particles were recovered.

METHOD EXAMPLES

Example 1

A method comprising: heating in a container a plurality of particles comprising a semiconductor; and adding to the container a first reactant comprising a metal and a second reactant comprising at least one of carbon, oxygen, or hydrogen, wherein: the heating and the adding result in the first reactant and the second reactant reacting, further resulting in the forming of an elastic layer on a surface of substantially each of the particles.

Example 2

The method of Example 1, wherein the heating is to a first temperature between 100° C. and 200° C.

Example 3

The method of Example 1, wherein the adding is performed at a second temperature substantially the same as the first temperature.

Example 4

The method of Example 1, further comprising, during at least one of the heating or the adding, directing a gas into the container, wherein the gas at least partially fluidizes the plurality of particles.

Example 5

The method of Example 4, wherein the gas is an inert gas.

Example 6

The method of Example 1, wherein at least one of the heating or the adding is performed at a pressure less than 1.01325 bar absolute.

Example 7

The method of Example 1, wherein the adding is repeated at least once.

Example 8

The method of Example 7, wherein each adding increases a thickness of the elastic layer between 1 nm and 10 nm.

Example 9

The method of Example 1, wherein the first reactant comprises an organometallic compound Example 10

The method of Example 9, wherein the first reactant is trimethylaluminum.

Example 11

The method of Example 1, wherein the second reactant comprises a polyol compound.

Example 12

The method of Example 11, wherein the second reactant is glycerol.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. An electrode material comprising:
    a solid core particle having an outer surface and comprising silicon and carbon; and
    a layer comprising a metal alkoxide selected from the group consisting of a vanadium alkoxide, a niobium alkoxide, a zirconium alkoxide, a lanthanum alkoxide, a tantalum alkoxide, an iron alkoxide, a manganese alkoxide, and a magnesium alkoxide, wherein:
    the solid core particle has a characteristic length between greater than zero nanometers and 1000 nm,
    the layer substantially covers all of the outer surface,
    the layer has a thickness between greater than zero nanometers and 10 nm, and
    the layer is capable of elastically stretching as a result of expansion and contraction by the solid core as characterized by an elastic modulus between 25 GPa and 200 GPa.

2. The electrode material of claim 1, wherein the characteristic length is between greater than zero nanometers and 100 nm.

3. The electrode material of claim 1, further comprising:
    an ion comprising at least one of lithium, sodium, or magnesium, wherein:
    the ion is capable of reversible transfer through the layer, and
    the solid core particle is capable of reversible intercalation/decalation of the ion within at least a portion of the solid core particle.

4. The electrode material of claim 3, further comprising a specify capacity of greater 400 mAh/g after at least 100 cycles of the reversible interaction/decalation.

5. The electrode material of claim 4, further comprising a Coulombic efficiency of greater than 85%.

6. An electrode material comprising:
    a solid core particle having an outer surface and comprising graphite and silicon;
    a layer comprising a metal alkoxide selected from the group consisting of a vanadium alkoxide, a niobium alkoxide, a zirconium alkoxide, a lanthanum alkoxide, a tantalum alkoxide, an iron alkoxide, a manganese alkoxide, and a magnesium alkoxide;
    an ion comprising at least one of lithium, sodium, or magnesium;
    a specify capacity of greater 400 mAh/g; and a Coulombic efficiency of greater than 85%, wherein:
the solid core particle has a characteristic length between greater than zero nanometers and 100 nm,
the layer substantially covers all of the outer surface,
the layer has a thickness between greater than zero nanometers and 10 nm,
the layer has an elastic modulus between 25 GPa and 200 GPa,
the ion is capable of reversible transfer through the layer,
the solid core particle is capable of reversible intercalation/decalation of the ion within at least a portion of the solid core particle, and
the specific capacity and the Coulombic efficiency are maintained after at least 100 cycles of the reversible intercalation/decalation.

7. A method comprising:
heating in a container a plurality of particles having an outer surface comprising silicon and carbon; and
adding to the container a first reactant comprising a metal and a second reactant comprising at least one of carbon, oxygen, or hydrogen, wherein:
the heating and the adding result in the first reactant and the second reactant reacting, further resulting in the forming of an elastic layer which substantially covers all of the outer surface of each of the particles,
the particles are solid particles and have a characteristic length between greater than zero nanometers and 1000 nm,
the elastic layer has a thickness between greater than zero nanometers 10 nm,
the elastic layer is capable of elastically stretching as a result of expansion and contraction by the particles, as characterized by an elastic modulus between 25 GPa and 200 GPa, and
the elastic layer comprises a metal alkoxide selected from the group consisting of a vanadium alkoxide, a niobium alkoxide, a zirconium alkoxide, a lanthanum alkoxide, a tantalum alkoxide, an iron alkoxide, a manganese alkoxide, and a magnesium alkoxide.

8. The method of claim 7, wherein the heating is to a first temperature between 100° C. and 200° C.

9. The method of claim 7, wherein the adding is performed at a second temperature substantially the same as the first temperature.

10. The method of claim 7, further comprising, during at least one of the heating or the adding, directing a gas into the container, wherein the gas at least partially fluidizes the plurality of particles.

11. The method of claim 10, wherein the gas is an inert gas.

12. The method of claim 7, wherein at least one of the heating or the adding is performed at a pressure less than 1.01325 bar absolute.

13. The method of claim 7, wherein the adding is repeated at least once.

* * * * *